United States Patent
Hutchins et al.

(10) Patent No.: US 8,056,076 B1
(45) Date of Patent: Nov. 8, 2011

(54) METHOD AND SYSTEM FOR ACQUIRING A QUIESCEING SET OF INFORMATION ASSOCIATED WITH A VIRTUAL MACHINE

(75) Inventors: Greg Hutchins, Palo Alto, CA (US); Christian Czezatke, San Francisco, CA (US); Satyam B. Vaghani, Palo Alto, CA (US); Mallik Mahalingam, Sunnyvale, CA (US); Shaw Chuang, Mountain View, CA (US); Bich Le, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 1445 days.

(21) Appl. No.: 11/478,199

(22) Filed: Jun. 29, 2006

Related U.S. Application Data

(60) Provisional application No. 60/788,033, filed on Mar. 31, 2006.

(51) Int. Cl.
 G06F 9/46 (2006.01)
 G06F 9/455 (2006.01)
 G06F 12/00 (2006.01)
 G06F 12/16 (2006.01)
 G06F 7/00 (2006.01)
 G06F 11/00 (2006.01)
(52) U.S. Cl. .............. 718/1; 718/100; 711/6; 711/162; 726/24; 707/639; 707/648; 707/649; 714/4.11; 714/15; 714/13
(58) Field of Classification Search .................. None
 See application file for complete search history.

(56) References Cited

U.S. PATENT DOCUMENTS

| | | | |
|---|---|---|---|
| 5,852,715 A * | 12/1998 | Raz et al. | 709/201 |
| 6,016,536 A * | 1/2000 | Wu et al. | 711/173 |
| 6,625,623 B1 * | 9/2003 | Midgley et al. | 1/1 |
| 6,789,156 B1 | 9/2004 | Waldspurger | |
| 7,213,246 B1 * | 5/2007 | van Rietschote et al. | 718/1 |
| 7,254,733 B2 * | 8/2007 | Nichols et al. | 713/330 |
| 7,299,468 B2 * | 11/2007 | Casey et al. | 718/104 |
| 7,370,164 B1 * | 5/2008 | Nagarkar et al. | 711/162 |
| 7,383,405 B2 * | 6/2008 | Vega et al. | 711/162 |
| 7,484,208 B1 * | 1/2009 | Nelson | 718/1 |
| 7,802,302 B1 * | 9/2010 | Nagarkar et al. | 726/24 |
| 7,814,495 B1 * | 10/2010 | Lim et al. | 718/104 |
| 2004/0010787 A1 * | 1/2004 | Traut et al. | 718/1 |
| 2005/0027749 A1 | 2/2005 | Ohno et al. | |
| 2005/0108407 A1 | 5/2005 | Johnson et al. | |
| 2006/0085792 A1 | 4/2006 | Traut | |
| 2006/0101189 A1 * | 5/2006 | Chandrasekaran et al. | 711/6 |
| 2006/0184935 A1 * | 8/2006 | Abels et al. | 718/1 |
| 2007/0097992 A1 | 5/2007 | Singh et al. | |
| 2009/0300605 A1 * | 12/2009 | Edwards et al. | 718/1 |

* cited by examiner

*Primary Examiner* — Meng-Ai An
*Assistant Examiner* — Abdullah Al Kawsar

(57) ABSTRACT

A method and system for acquiring a quiesceing set of information associated with a virtual machine. A virtual machine is cloned. The cloned virtual machine has an associated persistent storage device. The state of the persistent storage device is transformed into a quiesced state of the cloned virtual machine by utilizing a shut-down process. The shut-down process is executed on the cloned virtual machine to quiesce the cloned virtual machine and the quiesceing set of information of the cloned virtual machine is automatically reduced to information stored on the persistent storage device.

17 Claims, 7 Drawing Sheets

METHOD AND SYSTEM FOR ACQUIRING A QUIESCEING SET OF INFORMATION ASSOCIATED WITH A VIRTUAL MACHINE

CROSS-REFERENCE TO RELATED U.S. PROVISIONAL APPLICATION

This application claims priority of U.S. Provisional Patent Application Ser. No. 60/788,033 entitled "A Method and System for Acquiring A Quiesceing Set of Information Associated With a Virtual Machine," filed 31 Mar. 2006 which is herein incorporated by reference in its entirety.

BACKGROUND OF THE INVENTION

1. Field of the Invention

The invention relates to a method and system for acquiring a quiesceing set of information associated with a virtual machine.

2. Background Art

Frequently, computers are dedicated to individuals or to specific applications. For example, an individual owns or is assigned his or her own personal computer (PC). Each time a business hires an employee whose job entails access to a computer, a new PC would be purchased and installed for that new hire. In other cases, a PC or server may be used to perform a specific task. For example, a corporation could have a server for hosting the company's web site, another server for handling emails, and yet another server for handling financial transactions. This one-to-one correlation was simple, straightforward, flexible, and readily upgradeable. However, one drawback to this set-up is that it is inefficient from a computer resource perspective.

The inefficiency stems from the fact that most software applications do not fully utilize the full processing potential of the computer upon which that software is installed. The processing power of a computer is largely defined by its interconnected hardware components. However, when creating software, programmers do not know the specific hardware capabilities of the computers upon which their software is to be ultimately installed upon. Consequently, programmers tends to be conservative when creating software in order to ensure that software can run on the vast majority of conventional, contemporary PCs or servers. As a result, software applications do not push the envelope set by hardware constraints. Furthermore, some applications may consume a great deal of processing power, while other computer applications are inherently less computing intensive. When the PC or server is running less computationally intensive applications, much of its hardware resources are underutilized. Furthermore, given hundreds or thousands of computers networked in an enterprise, the cumulative effect of the amount of wasted computing resources adds up.

In an effort to take advantage of all the underutilized computing resources, there have been efforts to design "virtual" machines. The concept of virtualization broadly describes the separation of a resource (e.g., computing resource) and/or request for a service from the underlying physical delivery of that service. In one example, with regards to virtual memory, computer software gains access to more memory than is physically installed, via the background swapping of data to disk storage. Similarly, virtualization techniques is applied to other IT infrastructure layers such as networks, storage, laptop hardware, server hardware, operating systems, and/or applications.

Through virtualization, the virtual infrastructure provides a layer of abstraction between computing, storage, networking hardware, and the applications running on it and enables a more efficient utilization of computing resources. In general, before virtualization, a single computer is associated with a single operating system image. The machine's hardware and software is tightly coupled and running multiple applications on the same machine can create conflict. Moreover, the machine is often underutilized and inflexible, which all leads to an inefficient use of computing resources. In contrast, with virtualization, operating system and applications are no longer tightly coupled to a particular set of hardware. Advantageously, the virtualized infrastructure allows IT administrators to manage pooled resources across an enterprise, creating a more responsive and dynamic environment.

Basically, a virtual machine entails loading a piece of software onto a physical "host" computer so that more than one virtual machine or more than one instance of an operating system can utilize the resources of that host computer. In other words, the virtual software package is loaded onto one or more physical host computers so that the processing resources of the host computers can be shared amongst many different virtual machines or more than one instance of an operating system. By sharing computing resources, virtual machines make more efficient use of existing computers. Moreover, in one example, each instance of an operating system accesses the host computer through its own virtual machine. From the viewpoint of the operating system, it appears as if it is operating off its own computer. Also, users can continue to operate in a manner that they had grown accustomed to in interacting with computers. Thus, rather than buying, installing, and maintaining new computers, companies can simply load virtual machine software to get more leverage off their existing computers. Furthermore, virtual machines do not entail any special training because they run transparently to the user. In addition, virtual machine technology makes it possible to run multiple instances of different operating systems concurrently on the same host or a group of hosts.

However, there is one drawback in exploiting virtual machines to their full potential. Because virtual machines are designed to maximize the most efficient use of the computing resources, there are typically not very much spare computing resources left over. Any spare computing resources are often used to host another virtual machine for another user. It is this very economic efficiency which poses serious issues with certain types of applications. Some applications are run infrequently, but when they do execute, these applications are extremely computing intensive.

For example, backup applications are often used to backup a company's data. The data is backed up periodically and stored in backup files so that if there happens to be a computer crash or failure, important data is not irretrievably lost. Frequently, in order to backup a virtual machine, a consistent subset of the entire running state of the virtual machine is needed. This subset of the state information is referred to as a quiesceing set.

Conventionally, a quiesceing set of state information associated with a virtual machine is obtained by executing a backup application program that quiesces the virtual machine. The quiesceing set of state information, or quiesced state, is then copied and saved. Frequently, the quiesced state used for backup includes primarily data stored in a persistent storage device (e.g. a disk drive). Also, additional data (e.g., caches and application-specific dump functions) may be obtained from a volatile memory. The quiesced state, in the event of a system crash, can be utilized to reconstruct the original state of the virtual machine.

Aside from being utilized to backup virtual machines, a quiesced state can be utilized for a variety of other purposes as well. In one example, a quiesceing set of information can be used for testing an application program. In another example, a quiesceing set of information can be utilized to monitor an application program or a device. Still, in another example, a quiesceing set of information can be used for simulations.

However, acquirement of the quiesced state without appreciably impacting the virtual machine can be difficult. As mentioned, because virtual machines are highly efficient at utilizing computing resources, execution of a backup application can draw on a much larger amount of resources than usual and cause a resource utilization spike that negatively affects the performance of the virtual machine. Specifically, in one example, the execution of a backup application can consume a great deal of computing resources in terms of input/output (I/O) and processing bandwidth. In addition, under conventional approaches, each application may require its own quiesceing module, which adds to the overall computing resource drain. Furthermore, having a quiescing module for each application may also cause administrative overhead for a system administrator as different application specific modules may have to be deployed in different virtual machines.

In the past, when dedicated computers had a thick cushion of unused computing resources, these periodic computer resource intensive applications (e.g., backup application, data mining application, and/or virus scanning application) could execute in the background without disrupting or affecting the user's normal operation. However, with virtual machines, there are typically no spare computing resources to fall back on. Thus, virtual machine users, such as IT administrators, are faced with a dilemma. They could run the periodic applications and have the virtual machines suffer a performance hit. However, this is problematic when dealing with mission critical applications. For example, one would not want to impact the server handling a company's sales orders, even though backing up the sales information is vital. Alternatively, IT administrators could choose to use dedicated computers, but this is wasteful of computing resources.

SUMMARY OF THE INVENTION

Methods and systems for acquiring a quiesceing set of information associated with a virtual machine are described. In one embodiment, the method includes cloning a virtual machine. The clone virtual machine has an associated persistent storage device. Moreover, the method includes transforming the state of the persistent storage device into a quiesced state of the cloned virtual machine. A shut-down process is executed on the cloned virtual machine to quiesce the cloned virtual machine. Additionally, the quiesceing set of information of the cloned virtual machine is automatically reduced to information stored on the persistent storage device.

Minimal impact methods and systems of performing an operation associated with a virtual machine are also described. In one embodiment, the method includes running a first virtual machine on a first host computer system and running a second virtual machine on a second host computer system. The second virtual machine is a replica of the first virtual machine. Further, the method includes shutting down the second virtual machine to quiesce the second virtual machine and automatically reducing the quiesceing set of information of the second virtual machine to information stored on a persistent storage device coupled with the second virtual machine. A disk image of the persistent storage device is saved and an operation is performed on the disk image.

DETAILED DESCRIPTION

Figure 1:
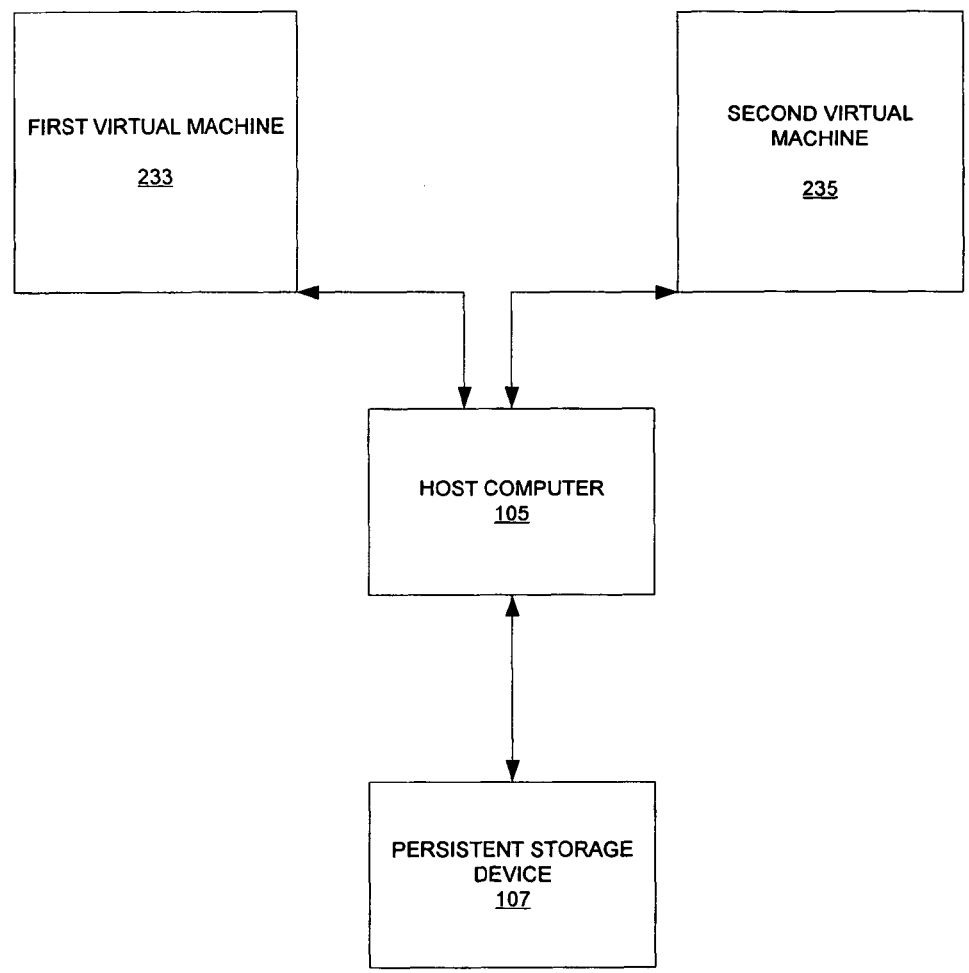
FIG. 1 illustrates block diagrams of a system for acquiring a quiesceing set of information associated with a virtual machine, upon which embodiments can be implemented.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which can be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention can be practiced without these specific details. In other instances, well known methods, procedures, components, and circuits have not been described in detail as not to unnecessarily obscure aspects of the invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "setting," "storing," "scanning," "receiving," "sending," "disregarding," "entering," or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

A computing device in operation has an associated set of state information. A set of state information can include the state of a physical and/or a virtual system associated with the computing device and can be, in one example, stored on non-volatile storage devices (e.g., disk drives). Traditionally, only parts of the system state are stored on non-volatile storage devices.

The set of state information associated with a virtual machine can be utilized, in one instance, to backup the virtual machine to guard against possible technical failures, natural disasters, and/or human error. In general, in order to backup a virtual machine properly to allow recovery in the event of a system crash, a subset of the state information that enables a consistent state of the data being processed to be obtained is needed. This subset of the state information is referred to as a quiesceing set.

Conventionally, a quiesceing set of state information associated with a virtual machine is obtained by executing a backup application program that quiesces the virtual machine. The quiesceing set of state information, or quiesced state, is then copied and saved. Frequently, the quiesced state used for backup includes primarily data stored in a persistent storage device (e.g. a disk drive). Also, additional data (e.g., caches and application-specific dump functions) may be obtained from a volatile memory. The quiesced state, in the event of a system crash, can be utilized to reconstruct the original state of the virtual machine.

However, acquirement of the quiesced state without appreciably impacting the virtual machine can be difficult. In one example, because virtual machines are highly efficient at utilizing hardware resources, tasks that need to performed periodically (e.g., a backup program, a virus scan program and/or a data mining program) tend to draw on a much larger amount of resources than usual and can cause a resource utilization spike that negatively affects the performance of the virtual machine.

In contrast to conventional approaches, embodiments set forth methods and systems for acquiring a quiesceing set of information associated with a virtual machine. In one embodiment, the method includes cloning a virtual machine. The clone virtual machine has an associated persistent storage device (e.g., a disk drive). Moreover, the method includes transforming the state of the persistent storage device into a quiesced state of the cloned virtual machine. A shut-down process is executed on the cloned virtual machine to quiesce the cloned virtual machine. Additionally, the quiesceing set of information of the cloned virtual machine is automatically reduced to information stored on the persistent storage device. In one example, a disk image of the persistent storage device is saved. By leveraging off the shut down process, the set of quiesced data can be obtained without the need to load any special quiesceing modules.

In other embodiments, minimal impact methods and systems of performing an operation associated with a virtual machine are also described. In one embodiment, the method includes running a first virtual machine on a first host computer system and running a second virtual machine on a second host computer system. In one example, the first host computer and the second host computer do not share hardware resources. The second virtual machine is a replica of the first virtual machine. Further, the method includes shutting down the second virtual machine to quiesce the second virtual machine and automatically reducing the quiesceing set of information of the second virtual machine to information stored on a persistent storage device coupled with the second virtual machine. A disk image of the persistent storage device is saved and an operation, such as a backup operation, a virus scan operation, and/or a data mining operation, is performed on the disk image without impacting the first virtual machine. In another embodiment, an operation (e.g., a backup operation) can be performed without having to shut down the second virtual machine.

Hence, embodiments allow a quiesced state of a virtual machine to be acquired without significantly affecting the performance of the virtual machine. Moreover, embodiments enable various operations associated with the virtual machine to be performed with minimal impact on the virtual machine.

FIG. 1 illustrates block diagrams of a system 109 for acquiring a quiesceing set of information associated with a virtual machine, upon which embodiments can be implemented. The system 109 includes a first virtual machine 233, a second virtual machine 235, a host computer 105 for hosting virtual machines, and a persistent storage device 107.

Although system 109 is shown and described as having certain numbers and types of elements, the embodiments are not necessarily limited to the exemplary implementation. That is, system 109 can include elements other than those shown, and can include more than one of the elements that are shown. For example, system 109 can include a greater or fewer number of virtual machines than the two virtual machines (virtual machine 233 and virtual machine 235) shown.

In one example, a quiesceing set of information associated with the first virtual machine 233 is desired. Conventionally, a user may simply quiesce the first virtual machine 233 in order to obtain the quiesceing set of information. For instance, the user may quiesce the first virtual machine 233 by shutting it down or by running a quiesceing application. However, doing so may interrupt or negatively impact the performance of first virtual machine 233.

To lessen the impact on the performance of the first virtual machine 233, in one embodiment, a clone (e.g., second virtual machine 235) of the first virtual machine 233 is created. Although in the present embodiment, second virtual machine 235 is hosted by host computer 108, other embodiments are not so limited. In one example, first virtual machine 233 and second virtual machine 235 can be run on different host computers.

In one embodiment, a fixed amount of computing resources is allocated from host computer 105 to first virtual machine 233 and second virtual machine 235. Thus, in one example, half of the computing resource available from the host computer 108 is dedicated to the first virtual machine 233 and half is dedicated to the second virtual machine 235. Hence, the amount of computing resources for the first virtual machine 233 remains constant and is unaffected by operations performed by the second virtual machine 235.

In the present embodiment, the persistent storage device 107 is accessible by the second virtual machine 235 and can be utilized to store a quesceing set of information associated with the second virtual machine 235.

The state of the persistent storage is transformed into a quiesced state of the second virtual machine 235 by executing a shut-down process on the second virtual machine 235. The shut-down process quiesces the second virtual machine 235 and automatically reduces the quiesceing set of information of the second virtual machine 235 to information stored on the persistent storage device 107. Because the second virtual machine 235 is a clone of the first virtual machine 233, the quiesceing set of information of the second virtual machine 235 is functionally equivalent to the quiesceing set of information of the first virtual machine 233.

Hence, the quiesceing set of information of the second virtual machine 235, among other functions, can be utilized to backup the first virtual machine 233. Furthermore, the quiesceing set of information of the second virtual machine 235 can be utilized to perform a virus scan or data mining operation.

Hence, embodiments of the present invention allow a quiesceing set of information associated with a virtual machine to be acquired without appreciably impacting its performance.

Figure 2:
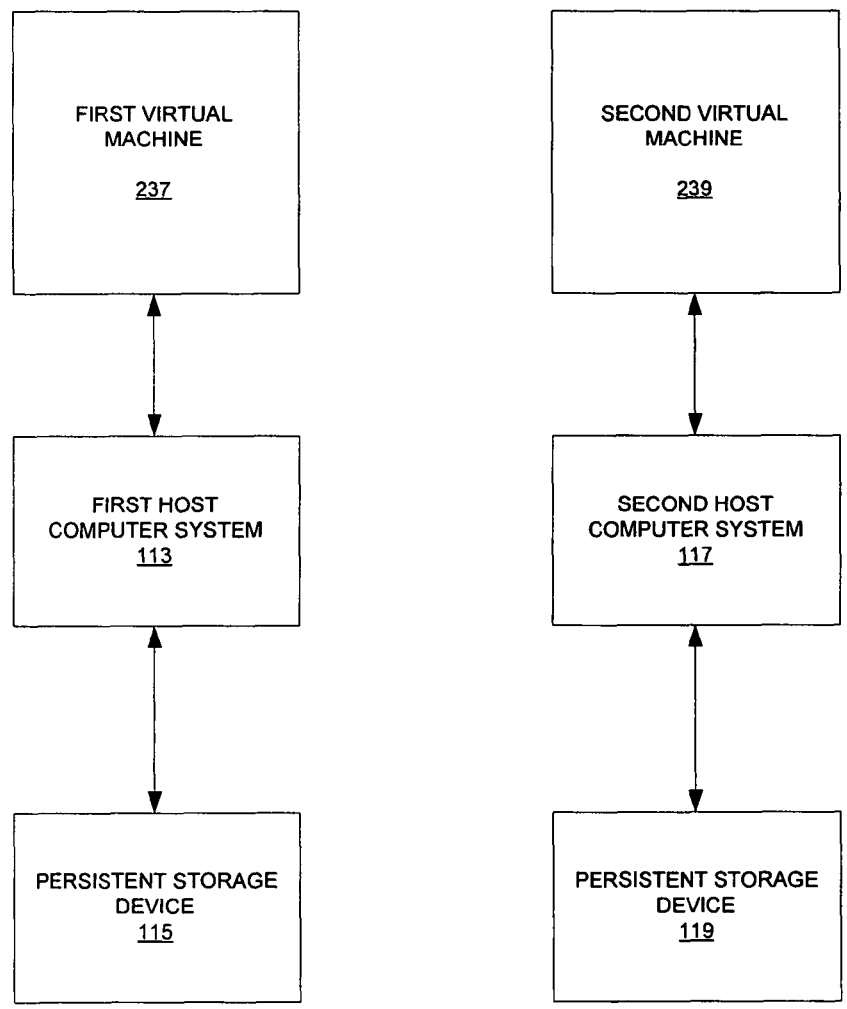
FIG. 2 illustrates block diagrams of a system for acquiring a quiesceing set of information associated with a virtual machine by shutting down a cloned virtual machine running another host computer, upon which embodiments can be implemented.

FIG. 2 illustrates block diagrams of a system 213 for acquiring a quiesceing set of information associated with a virtual machine by shutting down a cloned virtual machine running another host computer, upon which embodiments can be implemented. The system 213 includes a first virtual machine 237, a first host computer system 113, persistent storage device 115, a second virtual machine 239, a second host computer system 117, and persistent storage device 119.

In one embodiment, a first virtual machine 237 is running on a first host computer system 113, which has access to persistent storage device 115. A quiesceing state of the first virtual machine 237 is desired to perform an operation (e.g., backup operation, data mining operation, and/or virus scan operation) associated with the first virtual machine 237. However, it is further desired that the quiesceing state of the first virtual machine 237 be obtained without significantly impacting the performance of the first virtual machine 237.

In one embodiment, a replica of the first virtual machine 237 is created. In one embodiment, the replica is created in real-time without interrupting the operation of the first virtual machine. In one embodiment, redo-logs for the first virtual machine and the replica virtual machine are utilized to avoid the overhead of having to copy the entire persistent storage for the first virtual machine. A real time cloning method is described in the U.S. Patent Application Ser. No. 60/788,298, filed Mar. 31, 2006, entitled "REAL TIME CLONING OF A VIRTUAL MACHINE," by Ganesh Venkitachalam and Alex Moshchuk, assigned to the same assignee of the present patent application, which is hereby incorporated by reference. In an embodiment, a procedure is utilized to clone the memory associated with the first virtual machine. This procedure includes renaming the first virtual machine's main memory to a memory-image file of a snapshot of the first virtual machine, creating a first file to represent a first guest memory in the first virtual machine as the first virtual machine continues to execute, populating the first file with demand paging and prefetching from the memory-image file, creating a second file to represent a second guest memory for a clone or replica of the first virtual machine, and populating the second file with demand paging and prefetching from the memory-image file. The replica, second virtual machine 239, is run on a second host computer system 117. The second host computer system has hardware that is separate from that of the first host computer system 113. Consequently, operation of the second virtual machine 239 does not impact the hardware utilization on the first host computer system 113.

In the present embodiment, the second virtual machine 239 is shut-down to quiesce the second virtual machine 239. The quiesceing set of information of the second virtual machine 239 is automatically reduced to information stored on persistent storage device 119, which is coupled with the second host computer system 117. In one embodiment, a disk image of persistent storage device 119 is saved and an operation (e.g., virus check operation, data mining operation, and/or backup operation) is performed on the disk image. Moreover, in one embodiment, the disk image is forwarded to a special-purpose virtual machine dedicated to backup purposes. The special-purpose virtual machine is capable of recognizing the disk image as an attached virtual disk.

Hence, embodiments allow a disk image of a virtual machine to be acquired without appreciably affecting the performance of the virtual machine.

Figure 3:
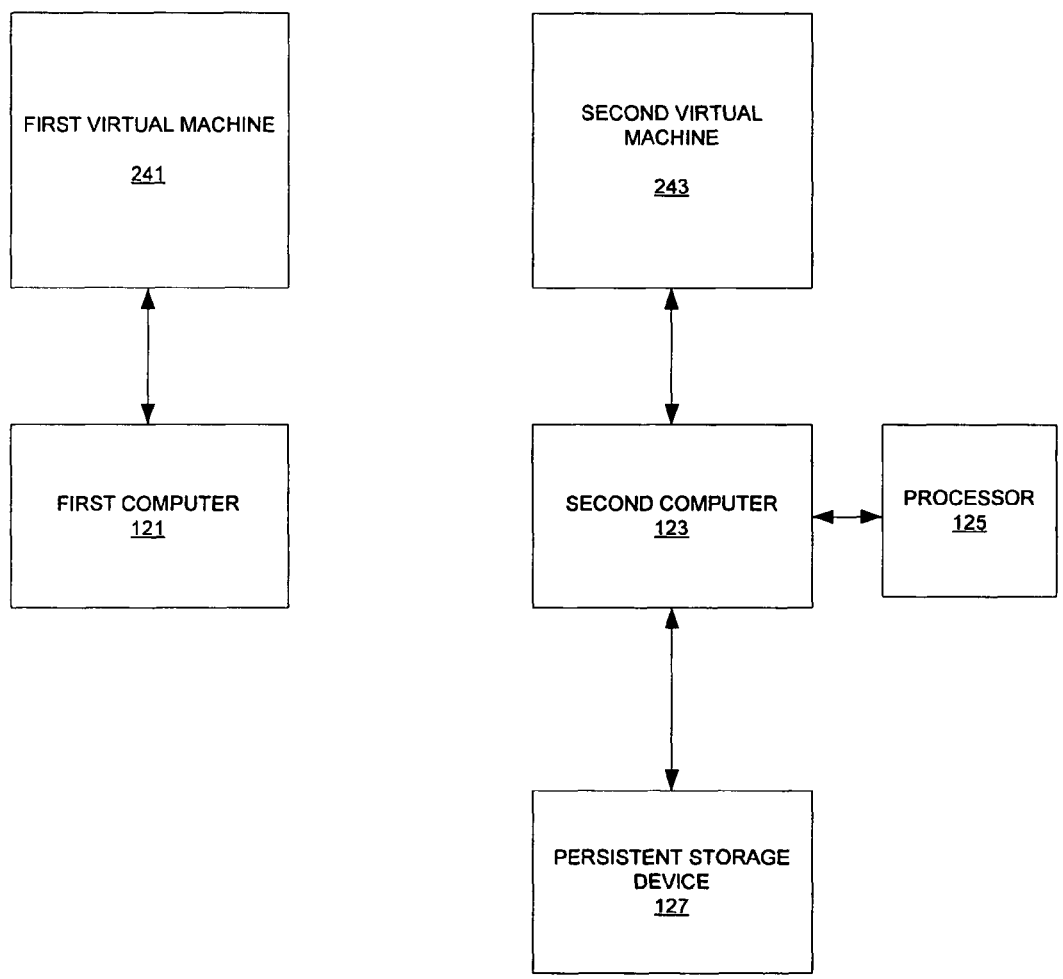
FIG. 3 illustrates block diagrams of a negligible affect computer system for performing an action associated a virtual machine, upon which embodiments can be implemented.

FIG. 3 illustrates block diagrams of a negligible affect computer system 301 for performing an action associated a virtual machine, upon which embodiments can be implemented. The system 301 includes a first virtual machine 241, a first computer 121 for hosting the first virtual machine 241, a second virtual machine 243, a second computer 123 for hosting the second virtual machine 243, a processor 125, and a persistent storage device 127 coupled with second computer 123.

The components of system 301 cooperatively operate to efficiently perform an action associated with a virtual machine without significantly impacting the virtual machine. In one embodiment, the first computer 121 is hosting first virtual machine 241. A user may desire to perform an action associated with the virtual machine, such as a periodical backup. But because virtual machines in general, such as first virtual machine 241, are highly efficient, there is often little or no hardware under-utilization. Thus, execution of an action, such as a periodical backup, can cause a resource utilization spike that impacts the performance of virtual machine 241.

On one hand, a user has the need to perform actions, such as a periodical backup, on first virtual machine 241 to ensure its recoverability. On the other hand, a user is concerned with affecting the performance of first virtual machine 241. In one example, first virtual machine 241 may be a server taking orders from online customers and periodical resource utilization spikes can negatively affect customers' shopping experience.

Recognizing this need, embodiments respond by, in one example, making a replica of first virtual machine 241. The replica, second virtual machine 243, is hosted by second computer 123. The second computer 123, in one example, has computing hardware resources independent from first computer 121. Hence, actions performed on the second virtual machine 243 do not affect the performance of the first virtual machine 241. By making a replica or a clone of the first virtual machine 241 and running it on a second computer 123. An action intended to be performed on the first virtual machine 241 can now be performed on the second virtual machine 243 without draining hardware resources from first computer 121.

In one embodiment, a shut-down procedure is implemented on the second virtual machine 243 to quiesce the second virtual machine 243 and to automatically reduce the quiesceing set of information of the second virtual machine 243 to information stored on a persistent storage device 127. Further, a disk image of the persistent storage device 127 is saved and processor 125 is utilized to perform an action, such as a backup action, on the disk image. In other examples, the disk image can be used to perform a virus scan and/or data mining on first virtual machine 241. Also, the disk image can be utilized for testing an application program, monitoring an application program or a device, and/or running simulations.

Figure 4:
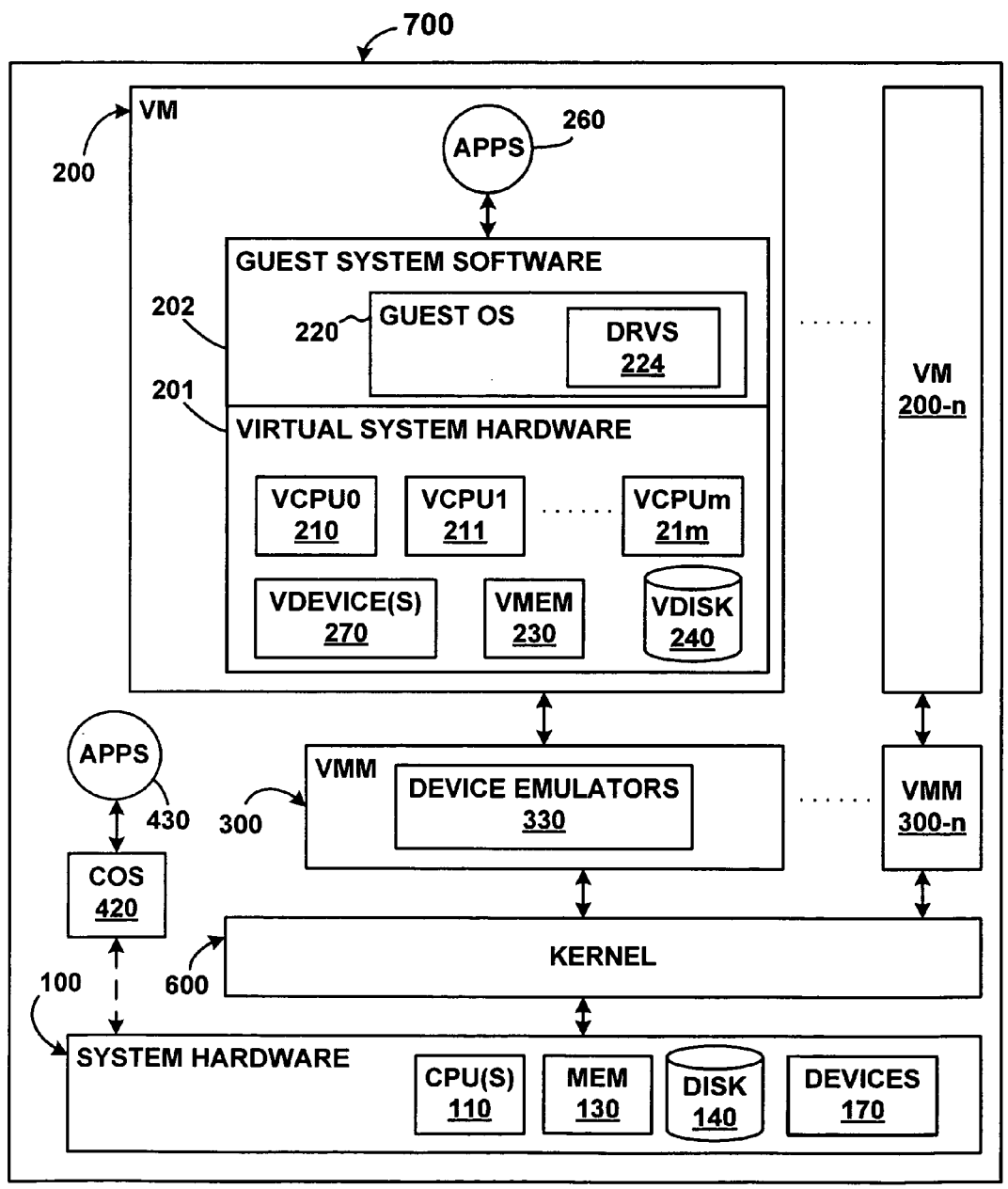
FIG. 4 illustrates an exemplary non-hosted virtual machine, upon which embodiments can be implemented.
Figure 5:
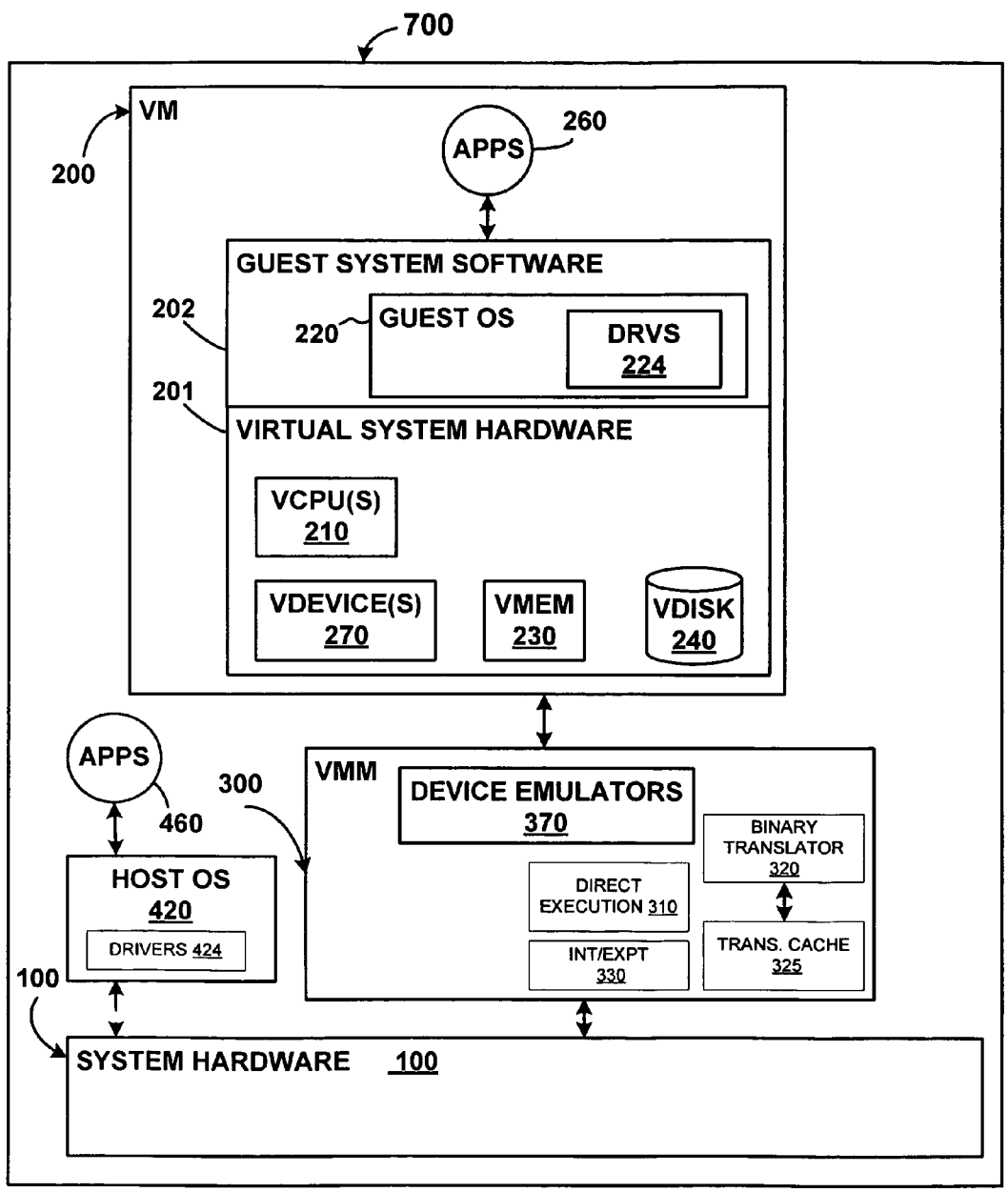
FIG. 5 illustrates an exemplary hosted virtual machine, upon which embodiments can be implemented.

Detailed descriptions of how a virtual machine is created, replicated, and transferred to a different host computer system are now disclosed. FIGS. 4 and 5 show a virtual machine and its functions.

As is well known in the field of computer science, a virtual machine (VM) is a software abstraction—a "virtualization"—of an actual physical computer system. FIG. 4 shows one possible arrangement of a computer system 700 that implements virtualization. A virtual machine (VM) 200, which in this system is a "guest," is installed on a "host platform," or simply "host," which will include a system hardware 100, that is, a hardware platform, and one or more layers or co-resident components comprising system-level software, such as an operating system (OS) or similar kernel (or hypervisor), a virtual machine monitor, or some combination of these.

As software, the code defining the VM will ultimately execute on the actual system hardware 100. As in almost all computers, this hardware will typically include one or more CPUs 110, some form of memory 130 (volatile and/or non-volatile), one or more storage devices such as one or more disks 140, and one or more devices 170, which may be integral or separate and removable.

In many existing virtualized systems, the hardware processor(s) 110 are the same as in a non-virtualized computer with the same platform, for example, the Intel x-86 platform. Because of the advantages of virtualization, however, some hardware vendors have proposed, and are presumably developing, hardware processors that include specific hardware support for virtualization.

Each VM 200 will typically mimic the general structure of a physical computer and as such will usually have both virtual system hardware 237 and guest system software 202. The virtual system hardware typically includes at least one virtual CPU 210, virtual memory 230, at least one virtual disk or storage device 240, and one or more virtual devices 270. Note that a storage disk—virtual 240 or physical 140—is also a "device," but is usually considered separately because of the important role it plays. All of the virtual hardware components of the VM may be implemented in software to emulate corresponding physical components. The guest system software typically includes a guest operating system (OS) 220 and drivers 224 as needed, for example, for the various virtual devices 270.

Similarly, a single VM may (but need not) be configured with more than one virtualized physical and/or logical processor. Each virtualized processor in a VM may also be multi-core, or multi-threaded, or both, depending on the virtualization. This invention may be used to advantage regardless of the number of processors the VMs are configured to have. FIG. 4, for example, illustrates multiple virtual processors 210, 119, . . . , 21*m* (VCPU0, VCPU1, . . . , VCPUm) within the VM 200. Each virtualized processor in a VM may also be multi-cored, or multi-threaded, or both, depending on the virtualization.

If the VM 200 is properly designed, applications 260 running on the VM will function essentially as they would if run on a "real" computer, even though the applications are running at least partially indirectly, that is via the guest OS 220 and virtual processor(s). Executable files will be accessed by the guest OS from the virtual disk 240 or virtual memory 230, which will be portions of the actual physical disk 140 or memory 130 allocated to that VM. Once an application is installed within the VM, the guest OS retrieves files from the virtual disk just as if the files had been pre-stored as the result of a conventional installation of the application. The design and operation of virtual machines in general are known in the field of computer science.

Some interface is generally required between the guest software within a VM and the various hardware components and devices in the underlying hardware platform. This interface—which may be referred to generally as "virtualization software"—may include one or more software components and/or layers, possibly including one or more of the software components known in the field of virtual machine technology as "virtual machine monitors" (VMMs), "hypervisors," or virtualization "kernels." Because virtualization terminology has evolved over time and has not yet become fully standardized, these terms do not always provide clear distinctions between the software layers and components to which they refer. For example, "hypervisor" is often used to describe both a VMM and a kernel together, either as separate but cooperating components or with one or more VMMs incorporated wholly or partially into the kernel itself; however, "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs is sometimes included in the host OS itself.

Unless otherwise indicated, the invention described below may be used in virtualized computer systems having any type or configuration of virtualization software. Moreover, the invention is described and illustrated below primarily as including one or more virtual machine monitors that appear as separate entities from other components of the virtualization software. This is only for the sake of simplicity and clarity and by way of illustration—as mentioned above, the distinctions are not always so clear-cut. Again, unless otherwise indicated or apparent from the description, it is to be assumed that the invention can be implemented anywhere within the overall structure of the virtualization software.

By way of illustration and example only, the figures show a VM (only one of which is shown, for simplicity) running on a corresponding virtual machine monitor. The description's reference to VMMs is also merely by way of common example. A VMM is usually a software component that virtualizes at least one hardware resource of some physical platform, so as to export a hardware interface to the VM corresponding to the hardware the VM "thinks" it is running on. A virtualized computer system may (and usually will) have more than one VM, each of which may be running on its own VMM.

The various virtualized hardware components in the VM, such as the virtual CPU(s) 210, etc., the virtual memory 230, the virtual disk 240, and the virtual device(s) 270, are shown as being part of the VM 200 for the sake of conceptual simplicity. In actuality, these "components" are often implemented as software emulations included in some part of the virtualization software, such as the VMM. One advantage of such an arrangement is that the virtualization software may (but need not) be set up to expose "generic" devices, which facilitate, for example, migration of VMs from one hardware platform to another.

Different systems may implement virtualization to different degrees—"virtualization" generally relates to a spectrum of definitions rather than to a bright line, and often reflects a design choice in respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another concept, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software. For some, para-virtualization implies that the guest OS (in particular, its kernel) is specifically designed to support such an interface. According to this view, having, for example, an off-the-shelf version of Microsoft Windows XP as the guest OS would not be consistent with the notion of para-virtualization. Others define para-virtualization more broadly to include any guest OS with any code that is specifically intended to provide information directly to the other virtualization software. According to this view, loading a module such as a driver designed to communicate with other virtualization components renders the system para-virtualized, even if the guest OS as such is an off-the-shelf, commercially available OS not specifically designed to support a virtualized computer system.

In addition to the distinction between full and partial (para-) virtualization, two arrangements of intermediate system-level software layer(s) are in general use—a "hosted" configuration (illustrated in FIG. 5) and a non-hosted configuration (illustrated in FIG. 4). In a hosted virtualized computer system, an existing, general-purpose operating system forms a "host" OS that is used to perform certain input/output (I/O) operations, alongside and sometimes at the request and direction of the VMM 300. The host OS 420, which usually includes drivers 424 and supports applications 460 of its own, and the VMM are both able to directly access at least some of the same hardware resources, with conflicts being avoided by a context-switching mechanism. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

In addition to device emulators 370, FIG. 5 also illustrates some of the other components that are also often included in the VMM of a hosted virtualization system; many of these components are found in the VMM of a non-hosted system as well. For example, exception handlers 330 may be included to help context-switching (see again U.S. Pat. No. 6,496,847), and a direct execution engine 310 and a binary translator 320 with associated translation cache 325 may be included to provide execution speed while still preventing the VM from directly executing certain privileged instructions (see U.S. Pat. No. 6,397,242, Devine, et al., "Virtualization System Including a Virtual Machine Monitor for a Computer with a Segmented Architecture," 28 May 2002).

In many cases, it may be beneficial to deploy VMMs on top of a software layer—a kernel (or "hypervisor") 600—constructed specifically to provide efficient support for the VMs. This configuration is frequently referred to as being "non-hosted." Compared with a system in which VMMs run directly on the hardware platform (such as shown in FIG. 5), use of a kernel offers greater modularity and facilitates provision of services (for example, resource management) that extend across multiple virtual machines. Compared with a hosted deployment, a kernel may offer greater performance because it can be co-developed with the VMM and be optimized for the characteristics of a workload consisting primarily of VMs/VMMs. The kernel 600 also handles any other applications running on it that can be separately scheduled, as well as any temporary "console" operating system 420 that, in some systems, is included to boot the system as a whole and for enabling certain user interactions with the kernel. The console OS in FIG. 4 may be of the same type as the host OS in FIG. 5, which is why they are identically numbered—the main difference is the role they play (or are allowed to play, if any) once the virtualized computer system is loaded and running. One example of a non-hosted, virtualized computer system is described in U.S. Pat. No. 6,961,941 (Nelson, et al., "Computer Configuration for Resource Management in Systems Including a Virtual Machine," 1 Nov. 2005.)

This invention may be used to advantage in both a hosted and/or a non-hosted virtualized computer system, in which the included virtual machine(s) may be fully or para-virtualized, and in which the virtual machine(s) have any number of virtualized processors, which may be of any type (including multi-cored, multi-threaded, or some combination). The invention may also be implemented directly in a computer's primary OS, both where the OS is designed to support virtual machines and where it is not. Moreover, the invention may even be implemented wholly or partially in hardware, for example in processor architectures intended to provide hardware support for virtual machines.

Figure 6:
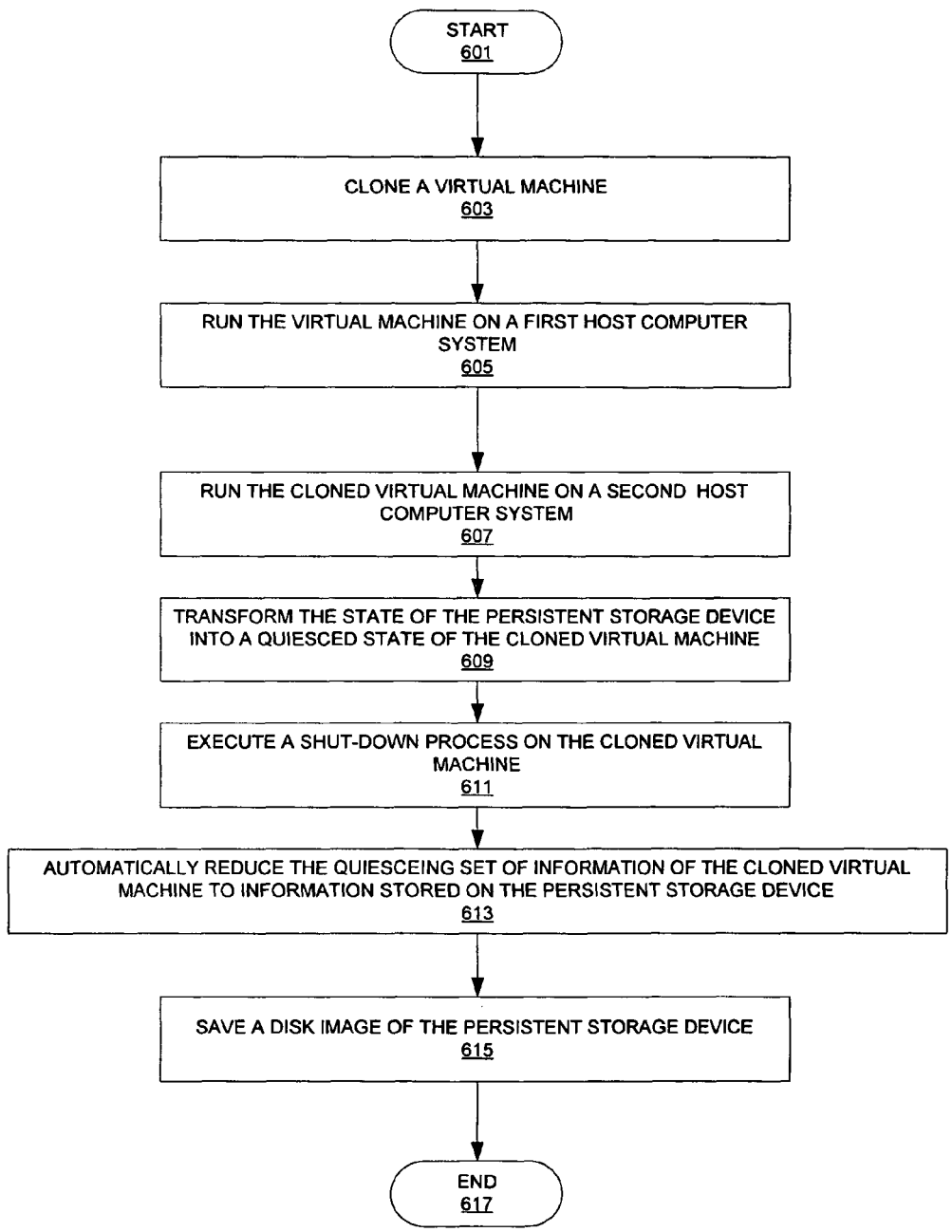
FIG. 6 illustrates a flowchart of a method for acquiring a quiesceing set of information associated with a virtual machine, upon which embodiments can be implemented.

FIG. 6 illustrates a flowchart 619 of a method for acquiring a quiesceing set of information associated with a virtual machine, upon which embodiments can be implemented. Although specific steps are disclosed in flowchart 619, such steps are exemplary. That is, embodiments are well suited to performing various other or additional steps or variations of the steps recited in flowchart 619. The steps in flowchart 600 can be performed in an order different than presented.

At block 601, the process starts. At block 603, a virtual machine is cloned. In one embodiment, a persistent storage device is associated with the cloned virtual machine. The persistent storage device is a non-volatile memory, such as Read-Only Memory (ROM), flash memory, hard disks, floppy disks, magnetic tapes, optical disk drives, and Magnetic Random Access Memory (MRAM).

At block 605, the virtual machine is run on a first host computer system. At block 607, the cloned virtual machine is run on a second host computer system. The second host computer system comprises hardware components separate from hardware components of the first host computer system. Because the cloned virtual machine draws from the computing resources of the second host computer systems only, in one example, the operation of the cloned virtual machine on the second host computer system does not impact the performance of the original virtual machine.

At block 609, the state of the persistent storage device is transformed into a quiesced state of the cloned virtual machine. The quiesced state, in one example, is capable of being utilized to backup a virtual machine properly to allow recovery in the event of a system crash. The quieseced state includes a subset of the state information that enables a consistent state of the data being processed to be obtained.

At block 611, a shut-down process is executed on the cloned virtual machine. In one embodiment, the shut-down process quiesces the cloned virtual machine. In another embodiment, the shut-down process achieves a consistent on-disk state. At block 613, the quiesceing set of information of the cloned virtual machine is automatically reduced to information stored on the persistent storage device.

At block 615, a disk image of the persistent storage device is saved. The disk image includes files locked by an operating system associated with the cloned virtual machine. At block 617, the process ends.

Figure 7:
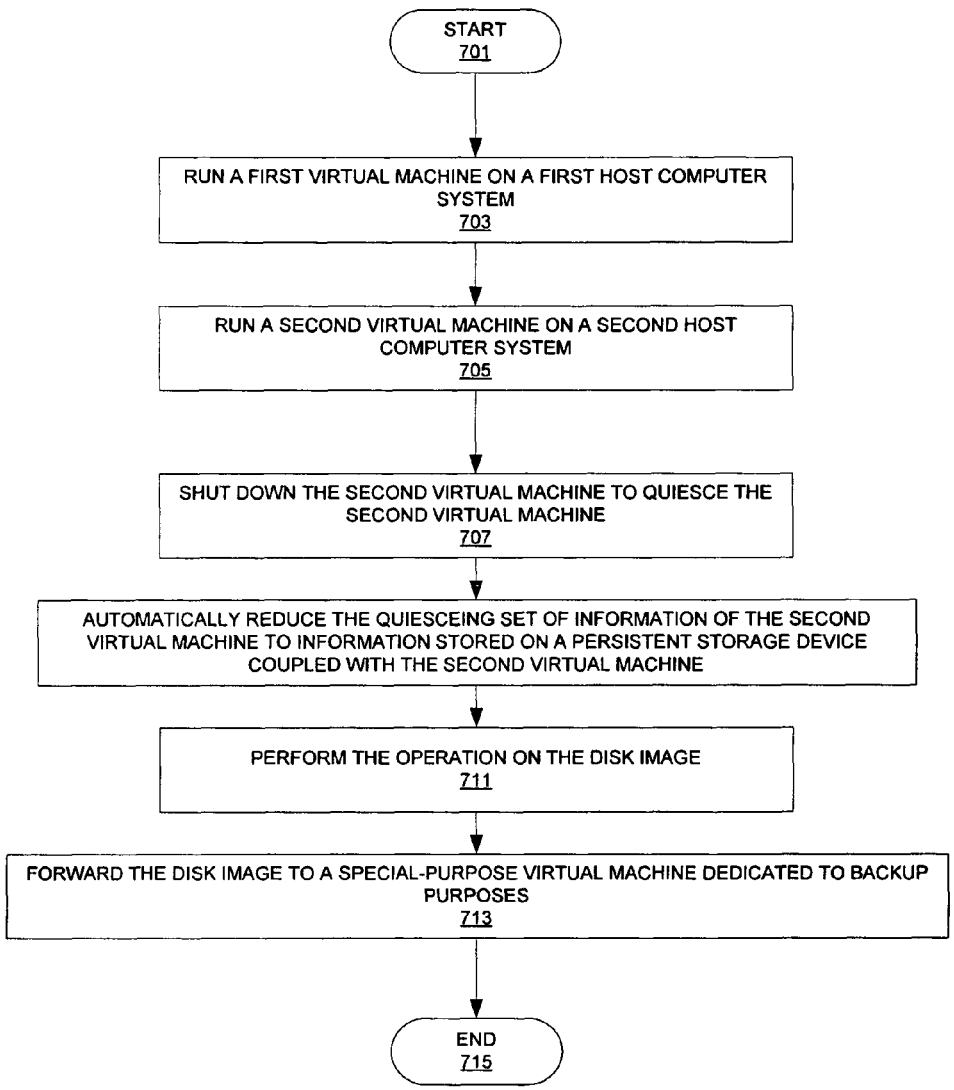
FIG. 7 illustrates a flowchart of a minimal impact method of performing an operation associated with a virtual machine, upon which embodiments can be implemented.

FIG. 7 illustrates a flowchart 719 of a minimal impact method of performing an operation associated with a virtual machine, upon which embodiments can be implemented. Although specific steps are disclosed in flowchart 719, such steps are exemplary. That is, embodiments are well suited to performing various other or additional steps or variations of the steps recited in flowchart 719. The steps in flowchart 719 can be performed in an order different than presented.

At block 701, the process starts. At block 703, a first virtual machine is run on a first host computer system. At block 705, a second virtual machine is run on a second host computer system. The second virtual machine is a replica of the first virtual machine. In one example, the second host computer system comprises hardware components separate from hardware components of the first host computer system. In one example, the operation of the cloned virtual machine on the second host computer system does not impact the performance of the original virtual machine.

At block 707, the second virtual machine is shut down to quiesce the second virtual machine. At block 709, the quiesceing set of information of the second virtual machine is automatically reduced to information stored on a persistent storage device coupled with the second virtual machine. Further, in one embodiment, a disk image of the persistent storage device is saved.

At block 711, the operation is performed on the disk image. In one embodiment, the operation does not affect computer resource utilization of the first virtual machine. The operation can be a virus check operation, a data mining operation, and/or a backup operation. Also, in other embodiments, the operation can be other types of operations that can be performed on a disk image.

At block 713, the disk image is forwarded to a special-purpose virtual machine dedicated to backup purposes. The special-purpose virtual machine is capable to recognize the disk image as an attached virtual disk. At block 715, the process ends.

To summarize, embodiments set forth methods for acquiring a quiesceing set of information associated with a virtual machine running on a host computer. A virtual machine is cloned and can be run on another host computer that has separate hardware components. The cloned virtual machine has an associated persistent storage device (e.g., disk drive). The state of the persistent storage device is transformed into a quiesced state of the cloned virtual machine by utilizing a shut-down process. The shut-down process is executed on the cloned virtual machine to quiesce the cloned virtual machine and the quiesceing set of information of the cloned virtual machine is automatically reduced to information stored on the persistent storage device. Thus, the embodiments allow a quiesceing set of information to be acquired without appreciably impacting the performance of the original virtual machine. By leveraging off the shut down process, the set of quiesced data can be obtained without the need to load any special quiesceing modules.

In the foregoing specification, embodiments of the invention have been described with reference to numerous specific details that can vary from implementation to implementation. Thus, the sole and exclusive indicator of what is, and is intended by the applicants to be the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for acquiring a quiesceing set of information associated with a virtual machine, said method comprising:
    cloning a virtual machine without interrupting the operation of said virtual machine, wherein a persistent storage device is associated with said cloned virtual machine; and
    transforming the state of said persistent storage device into a quiesced state of said cloned virtual machine;
    executing a shut-down process on said cloned virtual machine, wherein said shut-down process quiesces said cloned virtual machine; and
    automatically storing the quiesceing set of information of said cloned virtual machine on said persistent storage device;
    performing an operation on the quiesceing set of information of said cloned virtual machine stored on said persistent storage device;
    the method further comprising:
    renaming a main memory of said virtual machine to a memory-image file of a snapshot of said virtual machine;
    creating a first file to represent a first guest memory in said virtual machine as said virtual machine continues to execute;
    populating said first file with demand paging and prefetching from said memory-image file;
    creating a second file to represent a second guest memory for said cloned virtual machine; and
    populating said second file with demand paging and prefetching from said memory-image file.

2. The method of claim 1, further comprising:
    running said virtual machine on a first host computer system;
    running said cloned virtual machine on a second host computer system, wherein said second host computer system comprises hardware components separate from hardware components of the first host computer system.

3. The method of claim 1, further comprising saving a disk image of said persistent storage device.

4. The method of claim 3, wherein said disk image includes files locked by an operating system associated with said cloned virtual machine.

5. A minimal impact method of performing an operation associated with a virtual machine, said method comprising:
    running a first virtual machine on a first host computer system;
    creating a second virtual machine that is a replica of said first virtual machine without interrupting the operation of said first virtual machine;
    running said second virtual machine on a second host computer system-; and
    shutting down said second virtual machine to quiesce said second virtual machine;
    automatically storing the quiesceing set of information of said second virtual machine on a persistent storage device coupled with said second virtual machine, and wherein a disk image of said persistent storage device is saved; and
    performing said operation on said disk image;
    the method further comprising:

renaming a main memory of said first virtual machine to a memory-image file of a snapshot of said first virtual machine;
creating a first file to represent a first guest memory in said first virtual machine as said first virtual machine continues to execute;
populating said first file with demand paging and prefetching from said memory-image file;
creating a second file to represent a second guest memory for said second virtual machine; and
populating said second file with demand paging and prefetching from said memory-image file.

6. The method of claim 5, wherein said operation does not affect computer resource utilization of said first virtual machine.

7. The method of claim 5, wherein said operation is a virus check operation.

8. The method of claim 5, wherein said operation is a data mining operation.

9. The method of claim 5, further comprising forwarding said disk image to a special-purpose virtual machine dedicated to backup purposes, wherein said special-purpose virtual machine is capable to recognize said disk image as an attached virtual disk.

10. The method of claim 5, further comprising forwarding said disk image to a special-purpose physical machine.

11. A computer system for performing an action associated a virtual machine, said computer system comprising:
a first computer for hosting a first virtual machine;
a second computer for hosting a second virtual machine, wherein said second virtual machine is a replica of said first virtual machine that is created without interrupting the operation of said first virtual machine, and wherein a shut-down procedure is implemented on said second virtual machine to quiesce said second virtual machine and to automatically store the quiesceing set of information of said second virtual machine on a persistent storage device coupled with said second virtual machine, and wherein a disk image of said persistent storage device is saved; and
a processor coupled with said second computer for performing said action using said disk image wherein the processor is configured to:
rename a main memory of said first virtual machine to a memory-image file of a snapshot of said first virtual machine;
create a first file to represent a first guest memory in said first virtual machine as said first virtual machine continues to execute;
populate said first file with demand paging and prefetching from said memory image file;
create a second file to represent a second guest memory for said second virtual machine; and
populate said second file with demand paging and prefetching from said memory-image file.

12. The computer system of claim 11, wherein computing resources associated with said first computer are not affected by said processor performing said action.

13. The computer system of claim 11, wherein said action is a virus scan action.

14. The computer system of claim 11, wherein said action is a data mining operation.

15. A non-transitory computer-readable medium having computer-executable instructions for performing the steps comprising:
creating a replicated virtual machine copied from an original virtual machine without interrupting the operation of said original virtual machine, wherein said replicated virtual machine has the same state information, at one point in time, as said original virtual machine;
operating said replicated virtual machine;
shutting down said replicated virtual machine to quiesce said replicated virtual machine;
automatically storing the quiesceing set of information of said replicated virtual machine on a persistent storage device associated with said replicated virtual machine; and
storing a disk image of said persistent storage device;
performing an operation utilizing said disk image;
wherein the steps further comprise:
renaming a main memory of said original virtual machine to a memory-image file of a snapshot of said original virtual machine;
creating a first file to represent a first guest memory in said original virtual machine as said original virtual machine continues to execute;
populating said first file with demand paging and prefetching from said memory-image file;
creating a second file to represent a second guest memory for said replicated virtual machine; and
populating said second file with demand paging and prefetching from said memory-image file.

16. The non-transitory computer-readable medium of claim 15, wherein the operation further comprises performing a data mining operation associated with said original virtual machine.

17. The non-transitory computer-readable medium of claim 15, wherein the operation further comprises performing a virus scan operation for said original virtual machine.

* * * * *